United States Patent [19]
Chen et al.

[11] Patent Number: 5,757,688
[45] Date of Patent: May 26, 1998

[54] METHOD AND APPARATUS FOR HIGH SPEED DIVISION

[75] Inventors: Jason Chen, Ilan; Paul Chen; George Chang, both of Taichung, all of Taiwan

[73] Assignee: Holtek Microelectronics, Inc., Hsinchu, Taiwan

[21] Appl. No.: 527,793

[22] Filed: Sep. 13, 1995

[51] Int. Cl.$^6$ .......................................................... G06F 7/52
[52] U.S. Cl. .......................................................... 364/764
[58] Field of Search ...................... 364/764, 765, 364/766, 767

[56] References Cited

U.S. PATENT DOCUMENTS

| | | | |
|---|---|---|---|
| 4,718,032 | 1/1988 | Irukulla et al. | 364/765 |
| 4,742,480 | 5/1988 | Vaughn et al. | 364/764 |
| 5,365,471 | 11/1994 | Sato | 364/764 |

*Primary Examiner*—David H. Malzahn
*Attorney, Agent, or Firm*—Barnes, Kisselle, Raisch, Choate, Whittemore & Hulbert, P.C.

[57] ABSTRACT

A high speed division method and apparatus that does not require the use of dividers are provided. The method and apparatus utilize a binary shift-add technique to simplify a divisional computation process and to enable computational error to be contained in a predetermined range, and to obtain a higher computing speed. The apparatus includes a divisor left-shift apparatus for inputting a divisor and to left-shift the divisor, a dividend left-shift apparatus for inputting a dividend and to left-shift the dividend, a left-shift controller for controlling the left-shift motion of the divisor, a quotient right-shift apparatus for inputting the indexes from a division table and then right-shift the quotient. The apparatus utilizes left-shift or right-shift to achieve a multiplication or division by 2.

12 Claims, 3 Drawing Sheets

| DIVISOR  | 1  | 2  | 3  | 4 | 5 | 6 | 7 |
|----------|----|----|----|---|---|---|---|
| QUOTIENT | 32 | 16 | 11 | 8 | 6 | 5 | 5 |

FIG.2A

200 : FINE $\frac{10}{3}$ ;

201 : 10 < 16 , AND 3 < 4 ;

202 : $\frac{10*2}{3*2}$ ⇒ $\frac{20}{6}$ ;

210 : 20 > 16 ;

203 : K= ÷(6) = 5 ⇒ 00101 ;

204 : T = 5 , I = 0 , R = 0 ;

205 : 20 ≥ 16 ;

206 : $\frac{20}{6}$ - $\frac{16}{6}$ = $\frac{4}{6}$ ,
  R = 0 + 5 = 5 ;

207 : X = $\frac{4*2}{6}$ = $\frac{8}{6}$ ,
  K = [0010] 1 ,
  T = [0010] + 1 = 3 ;

208 : I = 0 + 1 = 1 ;

209 : I < ( Q+R+1 ) = 4 ;

210 : X = $\frac{8}{6}$ , 8 < 16 ,
  R = 5 + 0 = 5 ;

211 : X = $\frac{8*2}{6}$ = $\frac{16}{6}$ ,
  K = [0001] 0 ,
  T = [0001] + 0 = 1 ;

212 : I = 1 + 1 = 2 , I < 4 ;

213 : X = $\frac{16}{6}$ , 16 ≥ 16 ,
  R = R + T = 5 + 1 = 6 ;

214 : X = $\frac{16}{6}$ - $\frac{16}{6}$ = $\frac{0}{6}$ , X = $\frac{0}{6}$ * 2 ,
  K = [0000] 1 ,
  T = [0000] + 1 = 1 ;

215 : I = 2 + 1 = 3 , I < 4 ;

216 : X = $\frac{0}{6}$ , 0 < 16 ,
  R = R + 0 = 6 ;

217 : X = $\frac{0}{6}$ * 2 = $\frac{0}{6}$ ,
  K = [0000] 0 ,
  T = [0000] + 0 ;

218 : I = 3 + 1 , I ≥ 4 ;

219 : $\frac{10}{3}$ = $\frac{R}{2'}$ = 3 ;

FIG.2B

METHOD AND APPARATUS FOR HIGH SPEED DIVISION

FIELD OF THE INVENTION

The present invention generally relates to a method and apparatus for high speed division and more particularly, relates to a method and apparatus for binary division computations without using dividers.

BACKGROUND OF THE INVENTION

In a conventional microprocessor controller without using hardware division instructions, a divisional computation is carried out by a long division method. In a binary long division method, a series of subtractions must be executed in order to obtain a quotient. For instance, when the positive integer 8 is divided by 3, the steps of calculation that must be carried out in a long division are shown as follows:

|         | Divisor | Dividend       | Quotient |
|---------|---------|----------------|----------|
|         |         | 1000           | ?        |
| Step 1: | 0011    | 1000           | 1        |
|         |         | −0011          |          |
|         |         | ────           |          |
|         |         | 0101           |          |
|         |         | −0011          |          |
| Step 2: | 0011    | ────           |          |
|         |         | 0010           | 10       |

As shown above, the dividend 8 is expressed in binary as 1000, and the divisor 3 is expressed in binary as 0011. In step I, the magnitude of the divisor and the magnitude of the dividend is first compared. Since the divisor is smaller, it is first subtracted from the dividend leaving a remainder of 0101. After the first subtraction step, the value of the quotient is increased by 1.

In the second step of the calculation, it is first determined that the remainder is still larger than the divisor. The remainder is therefore used to subtract the divisor to obtain 0010. The quotient is advanced by another 1 to obtain 10. At this point, the remainder is smaller than the divisor such that the calculation can be stopped. The final value is 0010 and the remainder is 0010.

To carry out long division manually, subtraction and estimation steps are used. This is shown as follows:

Step 1:

$$\begin{array}{r}0010\\11\overline{)1000}\\\underline{11}\\10\end{array}$$

Step 2:

$$\begin{array}{r}0\\11\overline{)1000}\end{array}$$

1 < 11
quotient is 0;

$$\begin{array}{r}00\\11\overline{)1000}\end{array}$$

10 < 11
quotient is 0;

Step 3:

$$\begin{array}{r}001\\11\overline{)1000}\\\underline{11}\\1\end{array}$$

100 < 11
quotient is 1, remainder is 1;

Step 4:

$$\begin{array}{r}0010\\11\overline{)1000}\\\underline{11}\\10\end{array}$$

10 < 11
quotient is 10, remainder is 10.

As shown above, the binary computation used in a long division is very complicated and can only be carried out at a slow speed. It is not suitable for use in a microprocessor controller that executes simple functions.

In order to overcome the shortcomings of the long divisional method, others have attempted a method of lookup table. The lookup table method does not require any divider apparatus or calculation, it only requires a division table stored in a read only memory. By using a divisor and a dividend as the index, the quotient can be easily found in the division table. Even though the lookup table method is more efficient than the long division, the lookup table method requires a two-dimensional expression wherein the table size increases rapidly and requires large memory space. The method is therefore not suitable for use in low cost microprocessors.

It is therefore an object of the present invention to provide a method and apparatus for high speed division that does not have the drawbacks and shortcomings of the prior art methods.

It is another object of the present invention to provide a method and apparatus for high speed division that utilizes a simplified computational procedure.

It is a further object of the present invention to provide a method and apparatus for high speed division that only requires a small memory space for the storage of data.

It is another further object of the present invention to provide a method and apparatus for high speed division that utilizes a lookup table method in combination with a shift-add technique.

It is still another object of the present invention to provide a method and apparatus for high speed division without the use of dividers.

It is yet another object of the present invention to provide a method and apparatus of high speed division that utilizes simplified computational procedure and improved computational efficiency.

It is still another further object of the present invention to provide a method and apparatus for high speed division by utilizing a highly efficient computational method that is capable of controlling an error range.

SUMMARY OF THE INVENTION

In accordance with the present invention, a high speed divisional method and apparatus that do not require the use of dividers are provided. The method and apparatus utilize a binary shift-add technique in order to simplify a computational process. The present invention method and apparatus enable the computational error to be contained in a preset range and the execution of a computation at a higher speed.

The present invention method and apparatus of high speed division are designed to overcome the drawbacks and shortcomings of a conventional long divisional method. The method and apparatus can be used in any divisional calculations, especially those involved in microprocessor controllers that do not have hardware division instructions. The computing speed for the division can be greatly increased and furthermore, the error range of the quotient can be contained in a preset range.

The present invention method and apparatus utilize a remainder theory and a ½ exponent progression expression in the program. The present invention apparatus includes a divisor left-shift apparatus for inputting a divisor and left-shift the divisor, a dividend left-shift apparatus for inputting a dividend and then left-shift the dividend, a left-shift controller for controlling the left-shift action of the divisor, a quotient right-shift apparatus for inputting the indexed value of a division table and then right-shift the quotient. The apparatus utilizes left-shift or right-shift to achieve a process of multiplication or division by 2.

The present invention apparatus also includes an AND gate and an adder device. The AND gate is used to input the maximum number of bits output from the dividend left-shift apparatus, and inputting the output from the quotient right-shift apparatus, and then perform the AND gate functions. The adder is used to input the output from the AND gate, and then accumulates the output value from the AND gate. The apparatus utilizes addition to accumulate the value of the quotient such that the error of the last quotient can be contained in a preset range.

The division table used in the present invention apparatus includes a single array of quotients in order to save memory space required for a division table. The array of quotients is the result of calculation of a preset dividend divided by a divisor which has the value from one through the value of the divisor.

BRIEF DESCRIPTION OF THE DRAWINGS

Other objects, features and advantages of the present invention will become apparent upon consideration of the specification and the appended drawings, in which:

FIG. 2a is a division table for the present invention.

FIG. 2b shows the programming steps for the present invention method according to FIG. 1.

DETAILED DESCRIPTION OF THE PREFERRED EMBODIMENT

The present invention provides a method and apparatus for high speed division without using dividers. The method and apparatus utilize a binary shift-add technique in order to simplify a computational process. The method enables the error of computation to be confined in a preset range and is capable of high speed computing.

Figure 1:
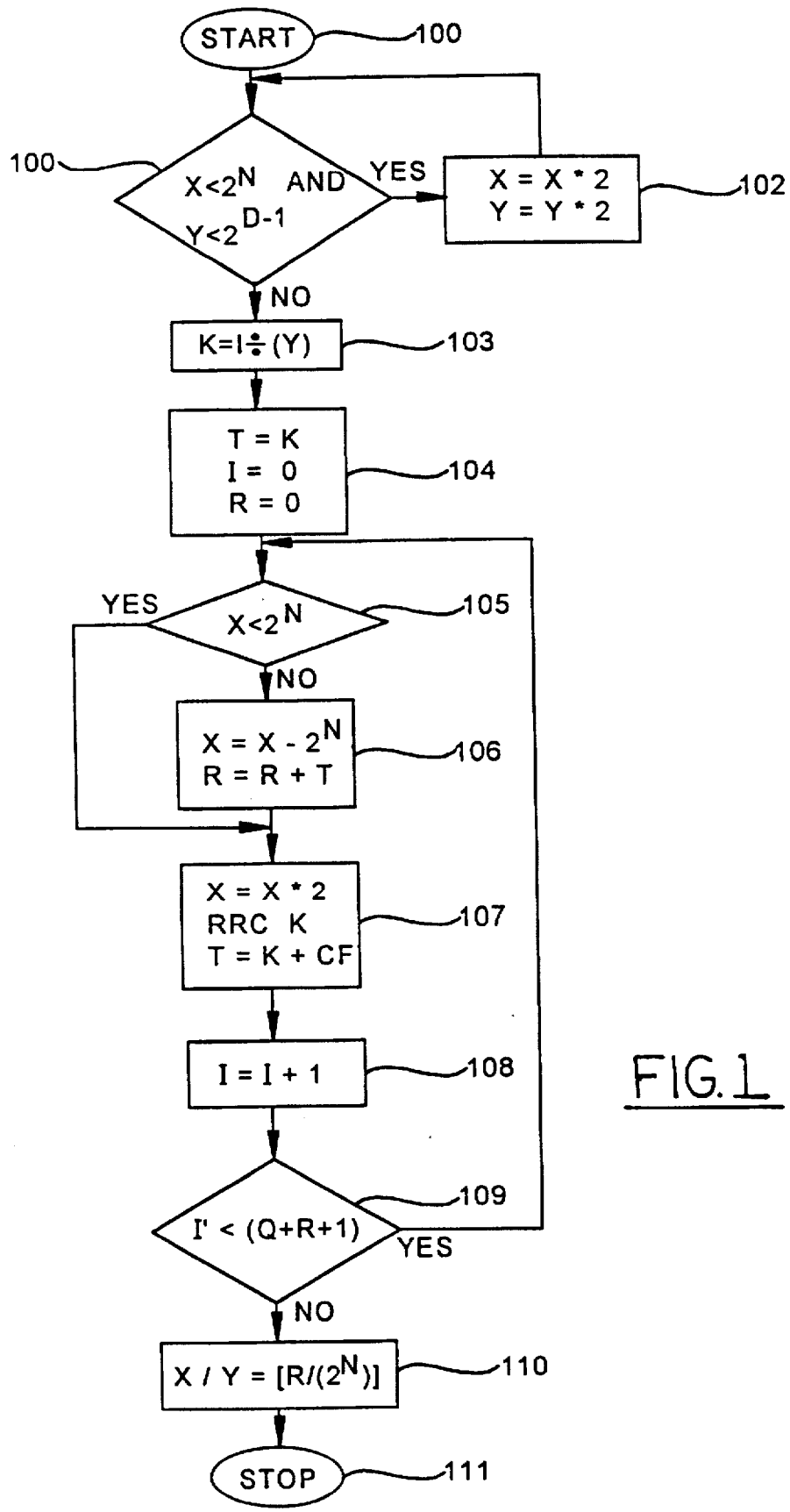
FIG. 1 is a flow chart of the present invention high speed division method.

Referring initially to FIG. 1, wherein a high level flow chart of the present invention method is shown. In the flow diagram, an example of X divided by Y in a binary system is shown. Q is the maximum number of bits for the binary quotient. The allowable error is within the range of $\pm(Q+r+1)*2^{-(1+r)}$. The quotient stored in the division table is Division Table $(i)=(2^{N+r})/i$ rounded to integer. $i$ is the divisor index, its value is from 1 through $(2^D-1)$. D is the maximum number of bits for the divisor. N is the maximum number of bits for the dividend. r is a reference value for the error.

The principle of operation of the present invention method is based on the remainder theory and a ½ exponent progression expression theory. The function of r is to first multiply the dividend by $2^r$ to obtain $(2^{N+r})/i$ in order to reduce the error of calculation. The error range for the quotient is Q+r bits due to the fact that the dividend was increased by $2^r$ times. In order to obtain one digit after the decimal point, the calculation must be executed (Q+r+1) times. The maximum error for each calculation is ½. The maximum error sum is (Q+r+1)*(½). The result is then multiplied by $2^{-r}$ in order to obtain the maximum error limit within the range of $\pm(Q+r+1)*2^{-(1+r)}$. From known quantities of N, D, Q, and the allowable error range, the value of r can be obtained for the division table. The size of the division table for the read only memory device is $(2^D-1)$, each read only memory device has N+r bits.

The flow diagram shown in FIG. 1 for the division method can be explained as follows:

100: Compute X/Y;

101: Determine whether the value of X is smaller than the value of maximum number of bits of the preset dividend, i.e., $2^N$ and the value of Y is smaller than the value of maximum number of bits−1 of the preset divisor, i.e., $2^{(D-1)}$. If these two conditions are satisfied, it indicates that the values of X, Y are within the preset range, step 102 is then executed. If these two conditions are not satisfied, it indicates that the divisor has already reached the maximum divisor index in the division table. Since $X \geq 2^N$, X has reached the maximum dividend range of $2^N$. Also, $Y \geq 2^{(D-1)}$, the maximum range of the division table has been reached. If the XY values are multiplied by 2 (to left-shift one bit), the division table range would have been exceeded. Execute 103;

102: Move X and Y left-shift 1 bit, respectively in order to multiply the numerator and the denominator each by 2 while maintaining the same value. Since the divisor and the dividend are each increased by a factor of 2, the step 101 should be repeated in order to determine whether the divisor and the dividend have reached their preset range. The step 101 and 102 are known as a shift approaching method.

103: At this time, the Y value indicates the largest divisor in the division table. The table is looked-up to obtain a quotient reference value. Store the quotient of the largest divisor from the division table temporarily into K, the quotient right-shift apparatus;

104: Store the value in K temporarily into T. Initialize the number of calculations, i, to 0, the result, R, to 0;

105: Determine again whether X is smaller than $2^N$, if yes, then execute 107; if no, than execute 106;

106: At this time, the dividend X is larger than the preset maximum dividend $2^N$, X is used to subtract the maximum dividend to obtain a remainder in order to continue executing the remainder displacement approaching step. Adding the value in T to the value of R in order to obtain a new result R;

107: If X is smaller than the preset maximum dividend, then continuing multiplying by 2, right-shift the value of K in order to divide by 2, and then store the K value and the flag value into T, the flag value is used for rounding purpose;

108: Increase the number of calculations by 1;

109: Determine whether the number of calculations is smaller than (Q+r+1);

110: Divide the value of R by $2^r$ in order to obtain the result required;

111: End.

The result of the above calculation is a binary division result with a decimal point. If the result of an integer is desired, it is only necessary to take the first digit below the decimal point as zero (delete) or 1 (forward).

To further illustrate the present invention method of calculation, the example of FIG. 1 is shown in a flow diagram. A division table for the present invention method is shown in FIG. 2a. The division table shown contains an array of quotients as a result of calculation by dividing a predetermined dividend by a number selected between 1 and up to the value of the divisor. As shown in FIG. 2a, the numerical values stored are rounded quotients based on a dividend of 16, and divisors from 1 through 7.

Assuming first that the dividend is a 4-bit number, the divisor is a 3-bit number, and the quotient is a 2-bit number. The allowable error is ±1. The division of 10 by 3 is to be executed. From an error $1<(Q+r+1)/2^{(1+r)}$, obtain r=1. Division Table $(i)=(2^{N+r})/i$, i=0–7.

FIG. 2b is a calculation procedure flow chart to the example flow diagram shown in FIG. 1.

201: First compare and determine if the dividend 10 is larger than 16, i.e., $2^4$; whether the dividend 3 is smaller than 4, i.e., $2^{3-1}$. Since the divisor and the dividend are both smaller than the preset range, execute step 202.

202: Left-shift 10 and 3 by 1 bit such that the numerator and the denominator are each multiplied by 2, i.e., this is known as a shift approaching method, such that they approach a maximum dividend of 16. Based on the fact that the present invention division table only stores all possible quotients with a dividend of 16, and possible divisors from 1 through 7. When lookup table method is used, then the dividend must be controlled in a range ≧16 so that the part, 16, can be separated out. Here, the dividend is 20, since 20>16, execute step 203.

203: Lookup the quotient for 16/6, the Division Table (6)=5. This is expressed in a binary system as 00101.

204: Store the quotient obtained from step 203, i.e., 00101 into T. Set R=0 where R is the resulting value.

205: The dividend 20 is larger than the preset maximum dividend 16.

206: Subtract 16/6 from 20/6 to obtain 4/6. Store the first obtained quotient value, i.e., 5 into R.

207: Multiply the numerator of the remainder 4/6 by 2. Since the numerator is multiplied by 2, the denominator should also be multiplied by 2, this is equivalent to divide 5 obtained from the division table by 2, i.e. right-shift 1 bit. Right-shift K 00101 to 0010.1, with the displaced 1 bit as a flag. T stores the result of K, 0010 plus flag 1 which is 0011. This number is reserved for use in the next calculation.

208: Increase the number of calculations by 1.

209: Determine if i has reached the pre-determined number of calculations. Since 1<4, the pre-determined number of calculations has not been reached. Execute 210.

210: Use the value reserved in the last calculation X=8/6, K=2, T=3. Since 8 is<16 and not reaching 16/6, the result of this calculation is R=5+0=5.

211: Multiply the numerator of the remainder 8/6 by 2. This is equivalent to dividing the value obtained from the division table by 2 (and right-shift 1 bit). K=0010 and then right-shift to K=0001.0. Then, the displaced bit has a flag of 0. T=K+CF=1. Multiplying the remainder to obtain the result of 16/6 and reserve for use in the next calculation.

212: i=1+1=2, since 2 is<4 and not reaching the number of calculations, continue execution.

213: Use the reserved value from the last calculation X=16/6, K=1, T=1. The dividend 16 is larger than or equal to the preset maximum dividend 16, calculate the result of the present calculation R=R+T=5+1=6.

214: Subtract 16/6 from X=16/6 to obtain 0/6. Multiplying by 2 to obtain X=0/6, right-shift K by 1 bit to obtain K=0000.1. T=K+CF=0000+1=00001. K=0000.

215: i=2+1=3, since 3<4, it has not reached the number of calculations, continue execution.

216: Use the reserved value from the last calculation, X=0/6, K=0, T=1, since the dividend 0 is<16, the result for this calculation R=6+0=6.

217: Multiply X=0/6 by 2 to obtain X=0/6, right-shift K by 1 bit, to obtain K=0000.0, T=K+CF, T=0+0=0, is reserve for the next calculation.

218: i=3+1=4=Q+r+1, the number of calculations has been reached.

219: The result is $X/Y=6/2^r=3$. From this result, the error in calculation is (10/3)−3=1/3. Since (1/3) is<1, the condition is satisfied.

Figure 3:
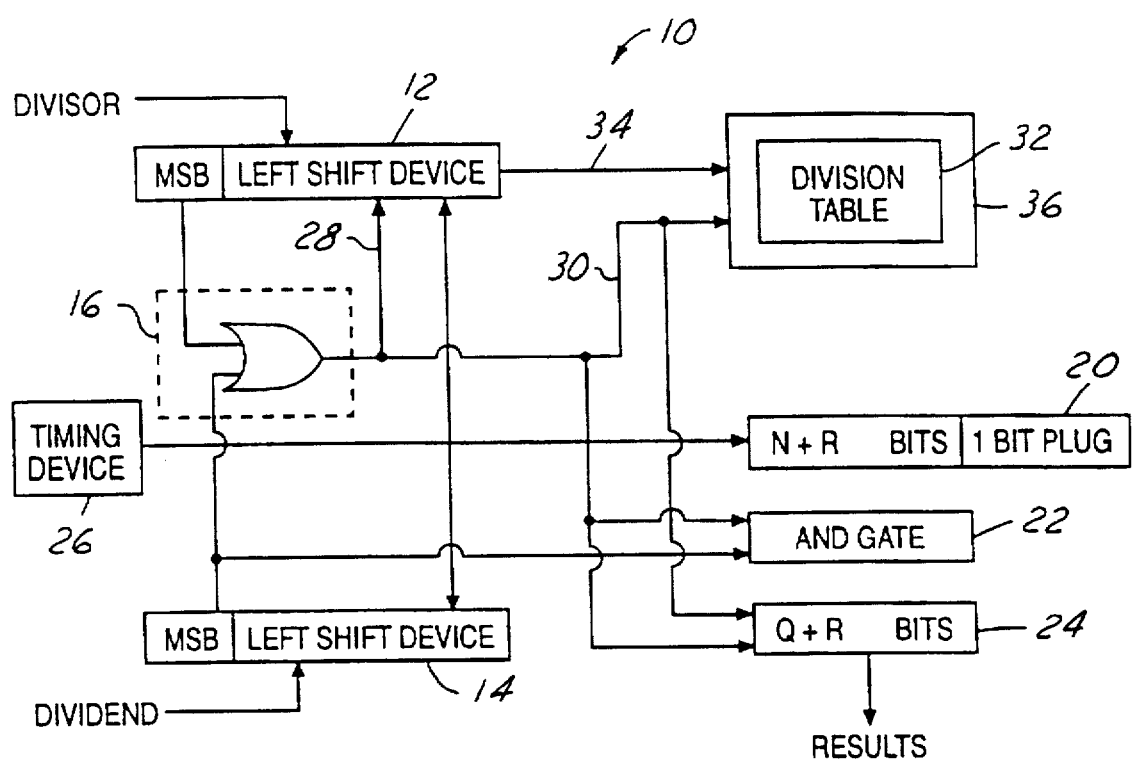
FIG. 3 is a logic diagram of the present invention apparatus.

FIG. 3 shows a functional block diagram of implementation of the present invention preferred embodiment. The present invention preferred embodiment apparatus 10 includes a divisor left-shift device 12, a dividend left-shift device 14, a left-shift controller 16, a division table 32, a quotient right-shift device 20, an AND gate 22, an adder 24, and a timing device 26.

As shown in FIG. 3, the divisor left-shift device 12 has D bits for storing divisor Y and performs the function of left-shift. The dividend left-shift device 14 has N+1 bits (N represents the number of bits for the dividend). The dividend left-shift device 14 stores a dividend X and performs a left-shift function. The devices 12 and 14 follow a timing signal from the timing device 26 and are shifted to the left. The divisor left-shift device 12 can be controlled by a left-shift controller 16 for its shift to the left.

The divisor left-shift device 12, the dividend left-shift device 14, and the left-shift controller 16 operate according to a shift approaching method. When the most significant bit (MSB) of the divisor left-shift device 12 or the dividend left-shift device 14 is 1, which indicates the divisor or dividend is larger than the preset maximum dividend. At this time, there should be a "1" value inputted to the left-shift controller 16, and a "1" value inputted into the divisor left-shift device 12 through the control passage 28 to stop the left displacement action. An activation signal from passage 30 activates the division table 32 to stop the left displacement and the divisor after the stop is the divisor index value. The divisor index value is inputted into the division table through passage 34 to lookup the table.

The division table 32 is stored in the read only memory device 36. The quotient found by the index is inputted into a quotient right-shift device 20. The quotient right-shift device 20 executes a right-shift action, i.e. executing an action of division by 2. At the same time when the quotient right-shift device displaces one bit to the right, the dividend left-shift device 14 shifts one bit to the left, i.e executing the remainder approaching method.

An AND gate 22 controls the input into an adder 24. When the most significant bit of the dividend left-shift device 14 is 1, the value in the quotient right-shift device 20 is passed by the AND gate 22, and inputted into the adder 24 for accumulation. When the most significant bit of the dividend left-shift device 14 is 0, the value in the quotient right-shift device 20 is prohibited to pass by the AND gate 22, such that only 0 is added by the adder 24. By carrying out this accumulation operation, the quotient obtained each time the division table is looked-up is accumulated in order to obtain the final quotient.

A timing device 26 sends a timing signal to the divisor left-shift device 12, the dividend left-shift device 14, the quotient right-shift device 20, the AND gate 22, and the adder 24 such that left-shift or right-shift actions and additions according to the timing signal are performed. The timing signal further controls the addition of a flag signal or the action for arriving at a quotient.

Using the above example of dividing 10 by 3. Let N=4, D=3, Q=2, r=1, the number of calculations is controlled by the timing signal as Q+r+1=4 times. This is expressed in a binary system as:

$$\frac{1010}{0011}$$

The divisor left-shift device 12 stores a number 011. The dividend left-shift device 14 stores a number of 01010.

Since the dividend is smaller than the preset maximum dividend, the divisor left-shift device 12 and the dividend left-shift device 14 shift to the left by 1 bit simultaneously. The stored numbers are 110 and 10100 respectively. The dividend 10100 is now 20, which is larger than 16 therefore the left-shift controller 16 stops the left-shift motion of the divisor left-shift device. It further uses 0110 as the divisor index to lookup the division table and to obtain a quotient reference value of 00101 the value after digits after decimal point are deleted).

The quotient reference value 00101 is stored into a quotient right-shift device 20. Since the dividend left-shift device has a highest bit of 1, the AND gate 22 controls the input into the adder 24 such that the quotient reference value 00101 can be added into the adder 24. After the addition, the content of the adder 24 becomes 101. The number of calculation is 1, which is smaller than 4, and therefore the execution continues.

The dividend left-shift device 14 continues to shift to the left according to the timing device 26. The stored value is 01000 and the quotient right-shift is 00010 with a flag of 1. Since the highest bit of the dividend left-shift device is 0, the AND gate 22 controls the input into adder 24 such that 00010 is interrupted by the AND gate 22. The adder 24 after executing the addition of 0 still has a result of 5. The number of calculation is now 2, which is smaller than 4, and therefore execution continues.

The dividend left-shift device 14 continues shifting to the left according to the timing device 26. Its stored value is 10000 and the quotient right-shift of 00001 with a flag of 0. Since the highest bit of the dividend left-shift device is 1, the AND gate 20 passes the value of the quotient right-shift device 20 of 00001 and a flag of 0. It is also controlled by the timing device 26 to separately input the quotient and the flag into adder 24 to obtain a quotient of 110. The number of calculation is now 3, which is smaller than 4, and execution continues.

The dividend left-shift 14 continues to displace to the left according to the timing device 26. It stores a value of 00000, and the quotient right-shift is 00000 and a flag of 1. Since the dividend left-shift device has a highest bit of 0, the AND gate 22 controls the input into adder 24 such that the value from the quotient right-shift device 20 is stopped. The adder 24 after executing 0 times, the result is still 110. At this time, the number of calculations reaches 4, the result is therefore 110. The lower r bit is a digit after the decimal point, since r=1 in this example, the result is therefore 110. The value in the decimal system is 3, the error detected is (10/3) −3=⅓. This is smaller than the error value of ±1. The conditions are therefore met.

While the present invention has been described in an illustrative manner, it should be understood that the terminology used is intended to be in a nature of words of description rather than of limitation.

Furthermore, while the present invention has been described in terms of a preferred embodiment thereof, it is to be appreciated that those skilled in the art will readily apply these teachings to other possible variations of the invention.

The embodiments of the invention in which an exclusive property or privileges claims are defined as follows:

1. A method of high speed computation utilizing a shift-add technique comprising the steps of:
   reading a divisor and a dividend,
   executing a shift approaching method such that said divisor and said dividend are larger than or equal to a preset maximum dividend to obtain a first value,
   using the divisor of said first value as an index to lookup a division table to obtain a quotient reference value,
   dividing said preset maximum dividend by said divisor of said first value to obtain a second value,
   subtracting from said first value the said second value and obtaining a remainder,
   executing a remainder shift approaching method such that the numerator of said remainder is larger than or equal to said preset maximum dividend to obtain a third value, and
   executing an accumulation method to obtain a desirable result.

2. A method according to claim 1, wherein said shift approaching method further includes the steps of:
   multiplying the divisor and the dividend by 2 to obtain said first value when said divisor and said dividend are smaller than said preset maximum dividend.

3. A method according to claim 1, wherein said shift approaching method further comprising the step of:
   stopping an action of multiplication by 2 to obtain said first value when said divisor and said dividend are larger than or equal to said preset maximum dividend.

4. A method according to claim 1, wherein said shift approaching method further comprising the step of:
   multiplying a numerator of said divisor by 2 to obtain said third value when the numerator of said remainder is smaller than said preset maximum dividend.

5. A method according to claim 1, wherein said remainder shift approaching method further comprising the step of multiplying the quotient reference value by 2 when a numerator of said remainder is multiplied by 2.

6. A method according to claim 1, wherein said remainder shift approaching method further comprising the step of presetting an error range within $(Q+r+1)*2^{-(i+r)}$.

7. A method according to claim 1, wherein said accumulation step further comprising setting a calculation reference value as the number accumulation.

8. A method according to claim 1, wherein said accumulation step further comprising adding said quotient reference value to said third value.

9. A method according to claim 1, wherein said accumulation method further comprising the step of executing an accumulation when the numerator of said third value is larger than or equal to said preset maximum dividend.

10. An apparatus for high speed computation for obtaining a quotient from a divisor and a dividend by using a shift-add technique comprising:

a divisor left-shift device for receiving a divisor and then left-shift a bit of the divisor, a dividend left-shift device for receiving a dividend and then left-shift a bit of said dividend, a left-shift controller for controlling the left-shift action of said divisor left-shift device, and to stop the left-shift motion of said device when said divisor or said dividend is larger than a preset value, a quotient right-shift device for receiving a quotient reference value from a division table and then right-shift said quotient reference value, an AND gate for receiving a highest bit output from said dividend left-shift device and said quotient reference value to perform an AND action, and an adder for accumulatively adding the output of said AND gate.

11. An apparatus according to claim 10, wherein said division table is an array of quotient values, and said array quotient values are the result of calculation of a dividend divided by a number selected between 1 and up to a number equal to said dividend.

12. An apparatus for high speed computation for obtaining a quotient from a divisor and a dividend by using a shift-add technique comprising:

a divisor left-shift device for receiving a divisor and then left-shift a bit of the divisor, a dividend left-shift device for receiving a dividend and then left-shift a bit of said dividend, a left-shift controller including an OR gate for receiving a highest bit output from said divisor left-shift device and receiving a highest bit output from said dividend left-shift device, and then after performing a calculation outputting a control signal, said control signal being used to control the left-shift action of said divisor left-shift device and to control the start of said indexing in said division operation, a quotient right-shift device for receiving a quotient reference value from a division table and then right-shift said quotient reference value, an AND gate for receiving a highest bit output from said dividend left-shift device and said quotient reference value to perform an AND action, and an adder for accumulatively adding the output of said AND gate.

* * * * *